US008625318B2

(12) United States Patent
Kake et al.

(10) Patent No.: US 8,625,318 B2
(45) Date of Patent: Jan. 7, 2014

(54) POWER CONVERTER AND FUEL CELL SYSTEM INCLUDING THE SAME

(75) Inventors: Nin Kake, Nara (JP); Keiichi Sato, Kyoto (JP); Hiroaki Kaku, Shiga (JP); Hiroshi Nagasato, Shiga (JP); Akihito Ootani, Hyogo (JP); Toru Kushisaka, Nara (JP)

(73) Assignee: Panasonic Corporation, Osaka (JP)

( * ) Notice: Subject to any disclaimer, the term of this patent is extended or adjusted under 35 U.S.C. 154(b) by 199 days.

(21) Appl. No.: 13/144,061

(22) PCT Filed: Feb. 9, 2011

(86) PCT No.: PCT/JP2011/000722
§ 371 (c)(1),
(2), (4) Date: Jul. 11, 2011

(87) PCT Pub. No.: WO2011/099280
PCT Pub. Date: Aug. 18, 2011

(65) Prior Publication Data
US 2013/0108938 A1      May 2, 2013

(30) Foreign Application Priority Data

Feb. 9, 2010   (JP) .................................. 2010-026193

(51) Int. Cl.
*H02M 7/537*      (2006.01)
(52) U.S. Cl.
USPC ............................................ 363/131; 363/71
(58) Field of Classification Search
USPC ........ 363/16, 17, 55, 56.01, 65, 71, 131, 132; 323/259, 344
See application file for complete search history.

(56) References Cited

U.S. PATENT DOCUMENTS 6,104,624 A *   8/2000   Iwamoto et al. ................. 363/71
6,654,261 B2 * 11/2003   Welches et al. ................. 363/41
(Continued)

FOREIGN PATENT DOCUMENTS

JP        60-117564 A      6/1985
JP        10-336890 A     12/1998
(Continued)

OTHER PUBLICATIONS

International Search Report for International Application No. PCT/JP2011/000722, dated Apr. 5, 2011, 2 pages.

*Primary Examiner* — Adolf Berhane
(74) *Attorney, Agent, or Firm* — McDermott Will & Emery LLP

(57) ABSTRACT

A power converter of the present invention is configured to convert DC power generated by a power generator (1) into AC power. The power converter includes: a boost converter circuit (3) configured to boost an output voltage of the power generator (1); an inverter circuit (5) configured to convert an output voltage of the boost converter circuit (3) into AC power and to interconnect the AC power with a power system (2); a buck converter circuit (8) configured to perform power conversion of output power of the boost converter circuit (3) and to supply resultant power to an internal load (60); and a controller (9). The controller (9) is configured to control the output voltage of the boost converter circuit (3) to be lower than or equal to a second voltage value which is less than the maximum value of AC voltage of the power system (2), in a case of supplying output power of the power generator (1) to the internal load (60) via the boost converter circuit (3) and the buck converter circuit (8).

7 Claims, 4 Drawing Sheets

(56) References Cited

U.S. PATENT DOCUMENTS

| | | | |
|---|---|---|---|
| 7,138,730 B2* | 11/2006 | Lai | 307/82 |
| 7,518,886 B1* | 4/2009 | Lai et al. | 363/17 |
| 8,018,748 B2* | 9/2011 | Leonard | 363/95 |
| 8,030,788 B2* | 10/2011 | Xu et al. | 290/31 |
| 8,077,437 B2* | 12/2011 | Mumtaz et al. | 361/18 |
| 8,106,539 B2* | 1/2012 | Schatz et al. | 307/104 |
| 8,159,078 B2* | 4/2012 | Usselman et al. | 290/1 A |
| 8,212,409 B2* | 7/2012 | Bettenwort et al. | 307/82 |
| 8,238,130 B2* | 8/2012 | Wiegman et al. | 363/131 |
| 8,278,892 B2* | 10/2012 | Friebe et al. | 323/271 |
| 8,395,919 B2* | 3/2013 | Schroeder et al. | 363/131 |
| 2007/0101647 A1 | 5/2007 | Miyauchi et al. | |
| 2012/0092903 A1* | 4/2012 | Nania et al. | 363/34 |

FOREIGN PATENT DOCUMENTS

| | | |
|---|---|---|
| JP | 2001-068125 A | 3/2001 |
| JP | 2004-213985 A | 7/2004 |
| JP | 2006-067757 A | 3/2006 |
| JP | 2010-251147 A | 11/2010 |
| WO | WO 2005/068355 A1 | 7/2005 |

* cited by examiner

US 8,625,318 B2

POWER CONVERTER AND FUEL CELL SYSTEM INCLUDING THE SAME

This application is a 371 application of PCT/JP2011/000722 having an international filing date of Feb. 9, 2011, which claims priority to JP2010-026193 filed Feb. 9, 2010, the entire contents of which are incorporated herein by reference.

TECHNICAL FIELD

The present invention relates to a power converter configured to convert DC power generated by a power generator into AC power that is interconnectable with a commercial power system and to supply the power to an external load, and relates to a fuel cell system including the power converter.

BACKGROUND ART

Fuel cell systems are configured to supply power generated by a fuel cell to, for example, a household electrical load. The fuel cell in such a fuel cell system is interconnected with a commercial power system.

In such a fuel cell system, control is performed such that surplus power generated by the fuel cell does not flow into power of the power system. Specifically, there are known fuel cell systems in which surplus power generated by a fuel cell is consumed by an internal load (an electric heater) (see Patent Literatures 1 to 3, for example).

FIG. 4 is a block diagram schematically showing a schematic configuration of a fuel cell system disclosed in Patent Literature 1.

As shown in FIG. 4, the fuel cell system disclosed in Patent Literature 1 includes: a fuel cell 106 which is operated in a manner interconnecting with a commercial power system 167; an electric heater 153; and a heater controller 154. The fuel cell system is configured to supply surplus power generated by the fuel cell 106 to the electric heater 153. The heater controller 154 adjusts the amount of power supplied to the electric heater 153 by means of a switching element.

PTL 1: Japanese Laid-Open Patent Application Publication No. 2004-213985
PTL 2: Japanese Laid-Open Patent Application Publication No. 2001-68125
PTL 3: Japanese Laid-Open Patent Application Publication No. 60-117564

SUMMARY OF INVENTION

Technical Problem

However, in the fuel cell system disclosed in Patent Literature 1, if for example the commercial power system 167 momentarily loses power or the commercial power system 167 is opened for a short period of time due to engineering work performed thereon, then DC power generated by the fuel cell 106 is temporality supplied to and consumed by the electric heater 153. This causes an increased load on the switching element and the switching element generates heat, accordingly. Therefore, a large-sized radiation fin is required in order to dissipate the heat generated by the switching element. For this reason, the fuel cell system disclosed in Patent Literature 1 has problems of being large-sized, high-cost, etc.

The present invention has been made to solve the above conventional problems. An object of the present invention is to provide a power converter and a fuel cell system including the power converter, the power converter being capable of suppressing a load on a buck converter circuit when DC power generated by a power generator is temporarily supplied to an internal load such as an electric heater in a case where there is a fear that a reverse power flow into a power system may occur, that is, for example, a case where the power system momentarily loses power.

Solution to Problem

In order to achieve the above object, a power converter according to the present invention is configured to convert DC power generated by a power generator into AC power, and the power converter includes: a boost converter circuit configured to boost an output voltage of the power generator; an inverter circuit configured to convert an output voltage of the boost converter circuit into AC power and to interconnect the AC power with a power system; a buck converter circuit configured to perform power conversion of output power of the boost converter circuit and to supply resultant power to an internal load; and a controller. The controller is configured to control the output voltage of the boost converter circuit to be higher than or equal to a first voltage value which is greater than the maximum value of AC voltage of the power system, in a case of interconnecting output power of the power generator with the power system via the boost converter circuit and the inverter circuit, and to control the output voltage of the boost converter circuit to be lower than or equal to a second voltage value which is less than the maximum value of AC voltage of the power system, in a case of supplying output power of the power generator to the internal load via the boost converter circuit and the buck converter circuit.

This configuration makes it possible to suppress a load on the buck converter circuit when the DC power generated by the power generator is temporarily supplied to the internal load such as an electric heater in a case where there is a fear that a reverse power flow into the power system may occur. Therefore, a large-sized radiation fin for dissipating heat from a power switching element of the buck converter circuit is not necessary. This allows the power converter to be reduced in size and cost.

The above object, other objects, features, and advantages of the present invention will be made clear by the following detailed description of preferred embodiments with reference to the accompanying drawings.

Advantageous Effects of Invention

The power converter according to the present invention and a fuel cell system including the power converter are capable of suppressing a load on the buck converter circuit when the DC power generated by the power generator is temporarily supplied to the internal load such as an electric heater. Accordingly, the power converter according to the present invention and the fuel cell system including the power converter realize a reduction in size and cost of the power converter.

DETAILED DESCRIPTION OF THE PREFERRED EMBODIMENTS

Figure 1:
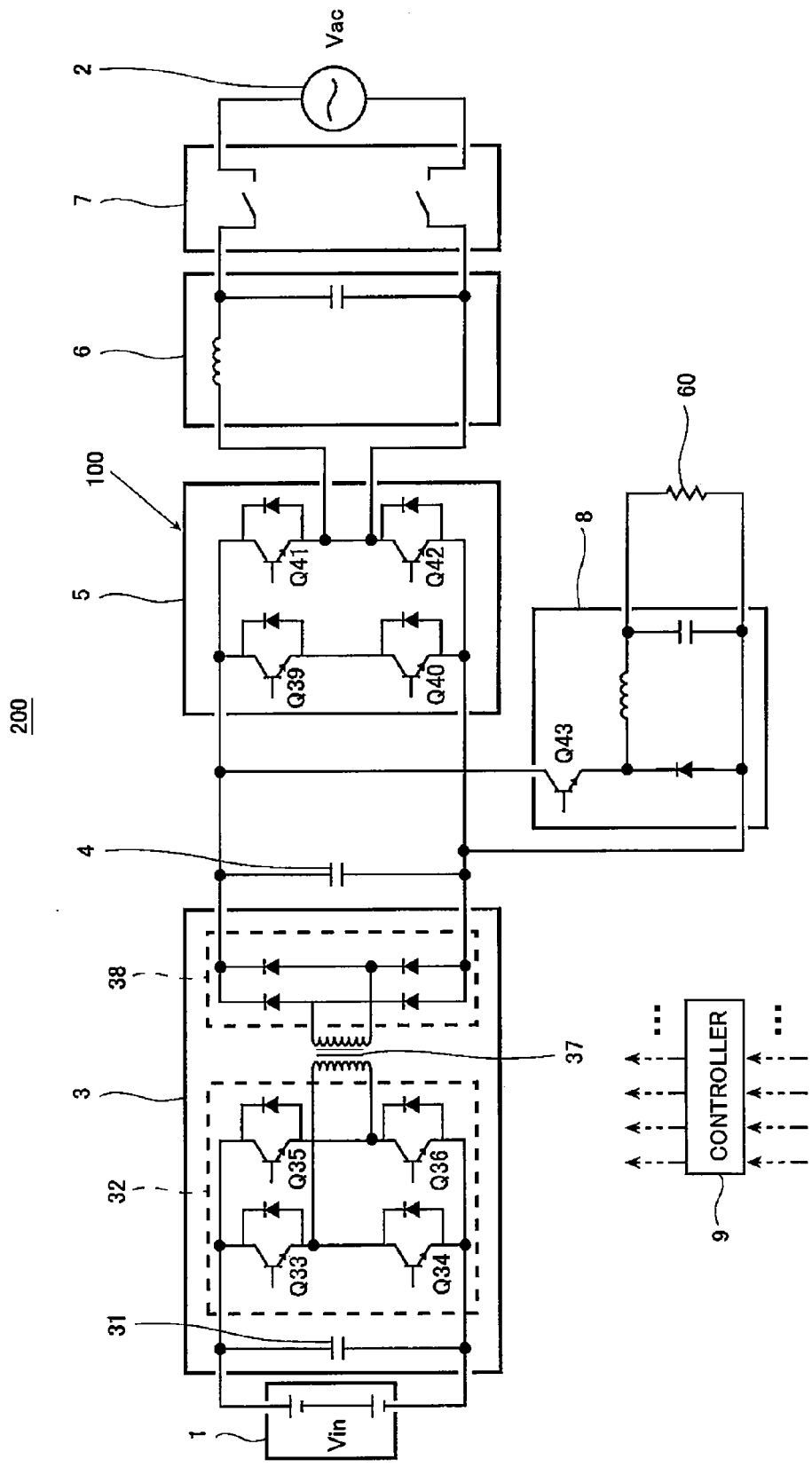
FIG. 1 is a schematic diagram showing a schematic configuration of a power converter and a fuel cell system including the power converter, according to Embodiment 1 of the present invention.

Hereinafter, preferred embodiments of the present invention will be described with reference to the drawings. In the drawings, the same or corresponding components are denoted by the same reference signs, and a repetition of the same description is avoided. In the drawings, only the components necessary for describing the present invention are shown, and the other components are omitted. Further, the present invention is not limited to the following embodiments.

(Embodiment 1)

A power converter according to Embodiment 1 of the present invention is configured to convert DC power generated by a power generator into AC power. The power converter includes: a boost converter circuit configured to boost an output voltage of the power generator; an inverter circuit configured to convert an output voltage of the boost converter circuit into AC power and to interconnect the AC power with a power system; a buck converter circuit configured to perform power conversion of output power of the boost converter circuit and to supply the resultant power to an internal load; and a controller. The power converter according to Embodiment 1 serves as an example in which the controller is configured to control the output voltage of the boost converter circuit to be higher than or equal to a first voltage value which is greater than the maximum value of AC voltage of the power system, in the case of interconnecting output power of the power generator with the power system via the boost converter circuit and the inverter circuit, and to control the output voltage of the boost converter circuit to be lower than or equal to a second voltage value which is less than the maximum value of AC voltage of the power system, in the case of supplying output power of the power generator to the internal load via the boost converter circuit and the buck converter circuit.

The maximum value of AC voltage of the power system varies depending on which geographical region the power converter is installed in. For example, the maximum value of AC voltage of the power system is in the rage of 100V to 672V.

It should be noted that the description below describes a case where the power generator is a fuel cell. However, in the present invention, the power generator is not limited to a fuel cell but may be any kind of power generator so long as it generates DC power. For example, a power generator such as a gas turbine or gas engine may be used alternatively.

[Configuration of Power Converter]

FIG. 1 is a schematic diagram showing a schematic configuration of the power converter and a fuel cell system including the power converter, according to Embodiment 1 of the present invention.

As shown in FIG. 1, a fuel cell system 200 according to Embodiment 1 of the present invention includes a power converter 100 and a fuel cell body 1. The power converter 100 according to Embodiment 1 is supplied with DC power from a DC power source (power generator) which is the fuel cell body 1 configured to generate a DC voltage from oxygen and a fuel gas of which a main component is hydrogen. The power converter 100 converts the DC power into 50 Hz or 60 Hz to supply, via an external load, AC power to an external load such as a household electrical appliance.

The power converter 100 according to Embodiment 1 includes: a boost converter circuit 3 configured to boost an input voltage Vin supplied from the fuel cell body 1; a capacitor 4 configured to remove a high-frequency component from the boosted voltage; an inverter circuit 5 configured to perform wave shaping of an output current into a sine wave; a filter 6 configured to remove high-frequency noise from an output from the inverter circuit 5; and a disconnection mechanism 7 which closes in the case of interconnecting output power of the inverter circuit 5 with a power system 2 and opens in the case of not interconnecting output power of the inverter circuit 5 with the power system 2. The power converter 100 is connected to the power system 2.

The boost converter circuit 3 includes a smoothing capacitor 31 configured to smooth an input voltage; a converter circuit 32 having an H-Bridge configuration in which four power switching elements S33 to Q36 are used; a high-frequency boosting transformer 37 of which the primary side is connected to the output of the converter circuit 32; and a rectifier circuit 38 connected to the secondary side of the high-frequency boosting transformer 37.

The inverter circuit 5 is configured as an H-Bridge circuit in which four power switching elements Q39 to Q42 are used. The output of the inverter circuit 5 is connected to the power system 2 via the filter 6 and the disconnection mechanism 7.

The output of the boost converter circuit 3 is connected to a buck converter circuit 8. The input of the buck converter circuit 8 is connected to the input of a power switching element Q43. The output of the buck converter circuit 8 is connected to the output of the power switching element Q43. The output of the buck converter circuit 8 is connected to an electric heater (internal load) 60.

Examples of materials that can be used for forming the power switching elements used in the boost converter circuit 3, inverter circuit 5, and buck converter circuit 8 include SiC, GaN, and SiGe. Moreover, these power switching elements may be formed as MOSFETs, IGBTs, or other transistors.

The electric heater (internal load) 60 is an electrical load which temporarily consumes DC power generated by the DC power source which is the fuel cell body 1 when the power system 2 momentarily loses power or when the power system 2 is opened for a short period of time due to engineering work performed thereon.

A controller 9 controls the buck converter circuit 8, which is configured to perform power conversion of output power of the boost converter circuit 3 and to supply the resultant power to the electric heater (internal load) 60, and controls the boost converter circuit 3, the inverter circuit 5, the disconnection mechanism 7, and the buck converter circuit 8 in order to prevent power from flowing back from the power system to the output of the inverter circuit 5.

If the output power of the inverter circuit 5 is in interconnection with the power system 2, the controller 9 controls the boost converter circuit 3 to maintain the output voltage of the boost converter circuit 3 to be higher than or equal to a first voltage value which is greater than the maximum value of AC voltage of the power system 2. In the case of causing the electric heater (internal load) 60 to consume all of the output power of the DC power source which is the fuel cell body 1 via the boost converter circuit 3 and the buck converter circuit 8, the controller 9 controls the boost converter circuit 3 such that the output voltage of the boost converter circuit 3 becomes a second voltage value which is less than the maximum value of AC voltage of the power system 2.

The first voltage value may be set to any value so long as the set value is greater than the maximum value of AC voltage of the power system 2. For example, the first voltage value is preferably 125% to 145% of the maximum value of AC voltage of the power system 2 from the standpoint of stably supplying power to an external load. Similarly, the second voltage value may be set to any value so long as the set value is less than the maximum value of AC voltage of the power system 2. For example, the second voltage value is preferably 35% to 55% of the maximum value of AC voltage of the power system 2 from the standpoint of causing the electric heater (internal load) 60 to consume power while suppressing a load on the power switching element Q43 of the buck converter circuit 8.

It should be noted that in the present invention, the term internal load refers to a device that consumes power and that is among the devices included in the system in which the power converter of the present invention is incorporated (in Embodiment 1, the fuel cell system). Moreover, the term external load refers to a device that consumes power and that is other than the devices included in the system in which the power converter of the present invention is incorporated (one example of external load is an electrical appliance used in a house where the fuel cell system is installed). Furthermore, examples of causing an internal load to consume all of the output power of the DC power source which is the fuel cell body 1 include charging a battery.

In Embodiment 1, the controller 9 is configured to control each of the power converter 100 and the fuel cell system 200. The controller 9 may be configured in any form so long as the controller 9 is configured as a device for controlling the devices included in the power converter 100 and fuel cell system 200. The controller 9 includes: a microprocessor; an arithmetic processing unit exemplified by, for example, a CPU; and a storage unit configured as a memory or the like which stores a program for performing control operations. Through the loading and execution, by the arithmetic processing unit, of a predetermined control program stored in the storage unit, the controller 9 performs various controls over the power converter 100 and the fuel cell system 200.

It should be noted that the controller 9 may be configured not only as a single controller, but as a group of multiple controllers which operate in cooperation with each other to control the power converter 100 and the fuel cell system 200. Moreover, the controller 9 may be configured as a microcontroller. Furthermore, the controller 9 may be configured as an MPU, PLC (Programmable Logic Controller), logic circuit, or the like.

In the power converter 100 and the fuel cell system 200 including the power converter 100 according to Embodiment 1, which are configured as described above, the controller 9 is configured to control, while the output power of the inverter circuit 5 is in interconnection with the power system 2, the boost converter circuit 3 such that the output voltage of the boost converter circuit 3 becomes higher than or equal to the first voltage value which is greater than the maximum value of AC voltage of the power system 2. Accordingly, the power converter 100 and the fuel cell system 200 including the power converter 100 according to Embodiment 1 can stably supply power to an external load.

Moreover, in the power converter 100 and the fuel cell system 200 including the power converter 100 according to Embodiment 1, the controller 9 is configured to control, in the case of causing the electric heater (internal load) 60 to consume all of the output power of the fuel cell body 1, the boost converter circuit 3 such that the output voltage of the boost converter circuit 3 becomes lower than or equal to the second voltage value which is less than the maximum value of AC voltage of the power system 2. Accordingly, the power converter 100 and the fuel cell system 200 including the power converter 100 according to Embodiment 1 can reduce power loss of the power switching element Q43 of the boost converter circuit 3 even in the case of causing the electric heater (internal load) 60 to consume all of the output power of the fuel cell body 1 when there is a fear that a reverse power flow into the power system 2 may occur, that is, for example, when the power system 2 momentarily loses power or the power system 2 is opened for a short period of time due to engineering work performed thereon.

Therefore, the power converter 100 and the fuel cell system 200 including the power converter 100 according to Embodiment 1 do not require a large-sized radiation fin for dissipating heat from the power switching element Q43 of the buck converter circuit 8. Further, unlike the conventional art, it is not necessary to increase, by means of the boost converter circuit 3, the output power of the fuel cell body 1 to be greater than or equal to the first voltage value and then step down, by means of the buck converter circuit 8, the output power of the fuel cell body 1 to a value that corresponds to power consumption by the electric heater 60. As a result, power loss at the time of boosting and stepping down the output power can be reduced. Accordingly, the output power can be efficiently converted into heat by means of the electric heater 60. This makes it possible to improve the reliability of the fuel cell system 200 and to reduce the size and cost of the power converter 100.

Further, in the power converter 100 and the fuel cell system 200 including the power converter 100 according to Embodiment 1, the controller 9 is configured to open the disconnection mechanism 7 in the case of controlling the output voltage of the boost converter circuit 3 to be the second predetermined voltage, which is lower than the maximum value of AC voltage of the power system 2, to cause the electric heater (internal load) 60 to consume all of the output power of the fuel cell body 1 via the boost converter circuit 3 and the buck converter circuit 8. This makes it possible to prevent power from flowing back from the power system 2 into the power converter 100, thereby further improving the reliability of the fuel cell system 200.

(Embodiment 2)

Figure 2:
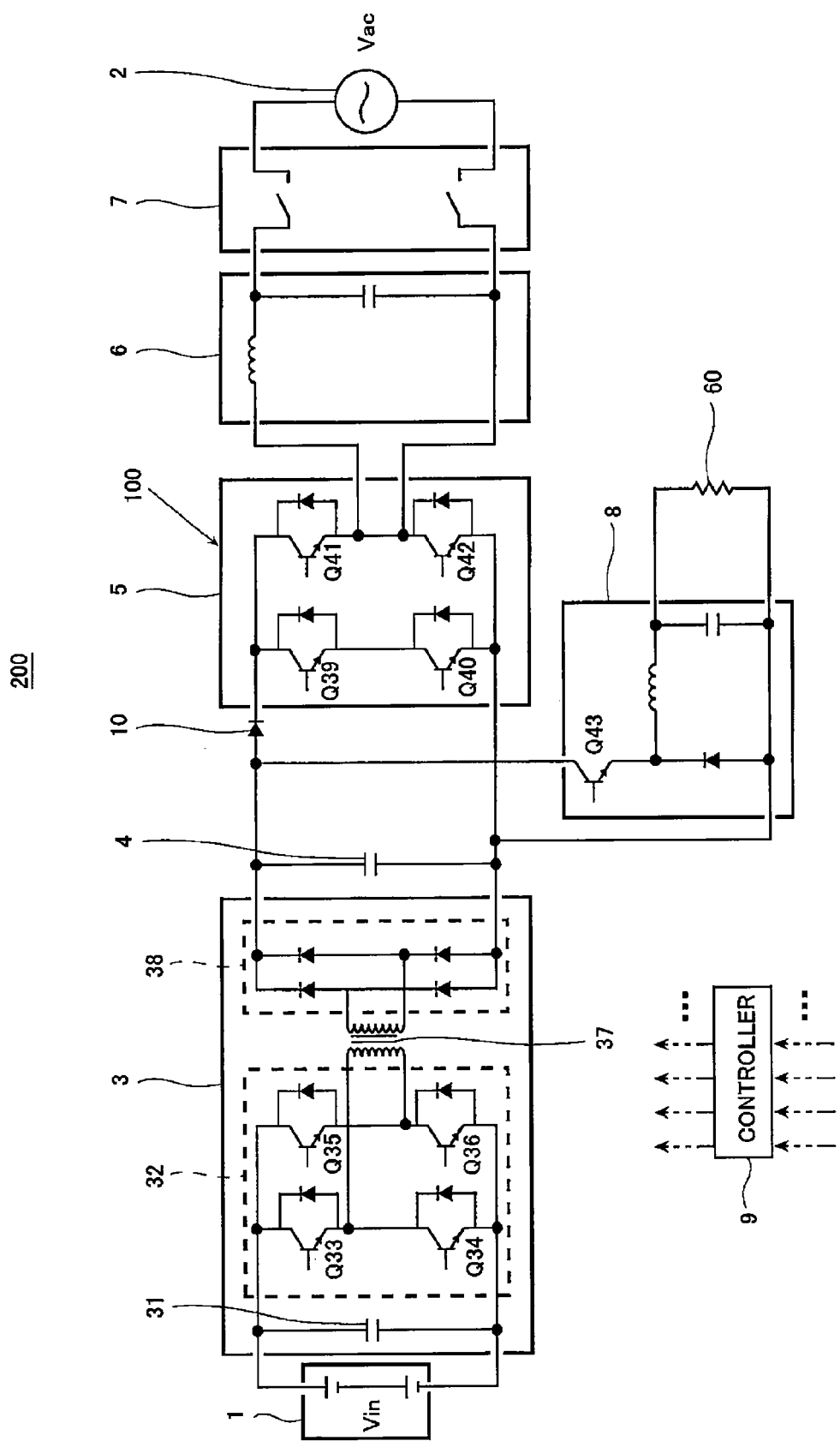
FIG. 2 is a schematic diagram showing a schematic configuration of a power converter and a fuel cell system including the power converter, according to Embodiment 2 of the present invention.

FIG. 2 is a schematic diagram showing a schematic configuration of a power converter and a fuel cell system including the power converter, according to Embodiment 2 of the present invention.

As shown in FIG. 2, the fundamental configuration of the power converter 100 and the fuel cell system 200 including the power converter 100 according to Embodiment 2 of the present invention is the same as that of the power converter 100 and the fuel cell system 200 including the power converter 100 according to Embodiment 1. However, Embodiment 2 is different from Embodiment 1 in that a diode 10 is disposed between the boost converter circuit 3 and the inverter circuit 5. Examples of materials that can be used for forming the diode 10 include SiC, GaN, and SiGe.

The power converter 100 and the fuel cell system 200 including the power converter 100 according to Embodiment 2, which are configured as described above, provide the same operational advantages as those provided by the power converter 100 and the fuel cell system 200 including the power converter 100 according to Embodiment 1.

In the power converter 100 and the fuel cell system 200 including the power converter 100 according to Embodiment 2, the diode 10 is disposed between the boost converter circuit 3 and the inverter circuit 5. This makes it possible to prevent power from flowing back from the power system 2 via the buck converter circuit 8 and the inverter circuit 5 into the fuel cell body 1.

(Embodiment 3)

A fuel cell system according to Embodiment 3 of the present invention includes: the above-described power converter; a fuel cell body; a heat recovery water passage through which heat recovery water for recovering heat from the fuel cell body flows; and a heating medium passage through which a heating medium for performing heat exchange with the heat recovered by the heat recovery water flows. The fuel cell system according to Embodiment 3 serves as an example where the internal load of the power converter is at least one of: a freeze protection heater; a heat recovery water heater configured to heat the heat recovery water flowing through the heat recovery water passage; and a heating medium heater configured to heat the heating medium flowing through the heating medium passage.

The fuel cell system according to Embodiment 3 may further include a hydrogen generator configured to reform a raw material gas and to supply the resultant fuel gas to the fuel cell body, and the internal load may be at least one of: a selective oxidation heater configured to heat a selective oxidizer formed in the hydrogen generator; and a shift conversion heater configured to heat a shift converter formed in the hydrogen generator.

The fuel cell system according to Embodiment 3 may further include a delivery device which is provided at the heat recovery water passage and which is configured to cause the heat recovery water to flow. The internal load may be a heat recovery water heater configured to heat the heat recovery water passage. In the case of supplying surplus power of the fuel cell body to the heat recovery water heater via the boost converter circuit and the buck converter circuit, the controller may control the delivery device to increase the water flow rate in the heat recovery water passage.

[Configuration of Fuel Cell System]

Figure 3:
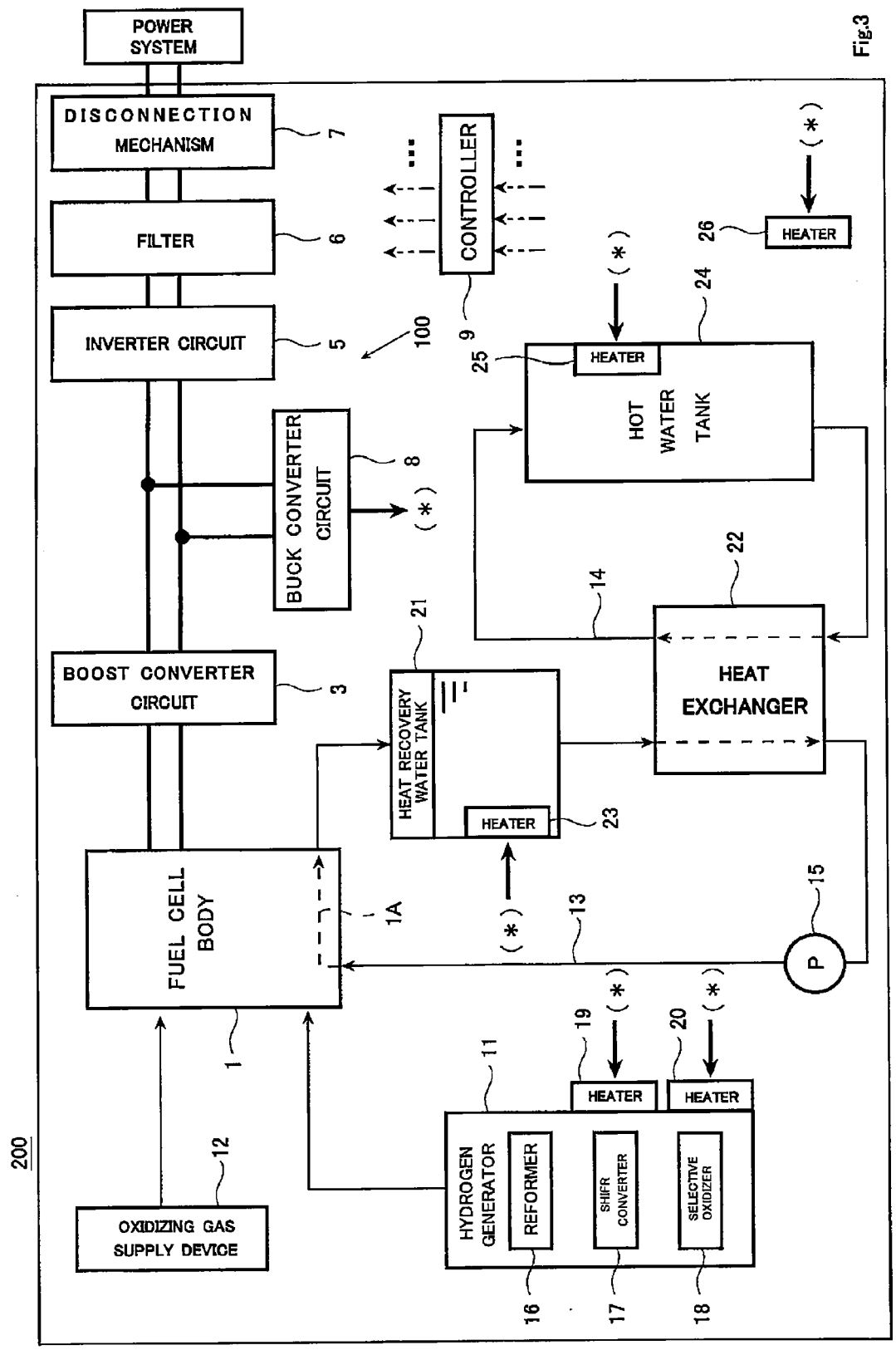
FIG. 3 is a block diagram showing a schematic configuration of a fuel cell system according to Embodiment 3 of the present invention.
Figure 4:
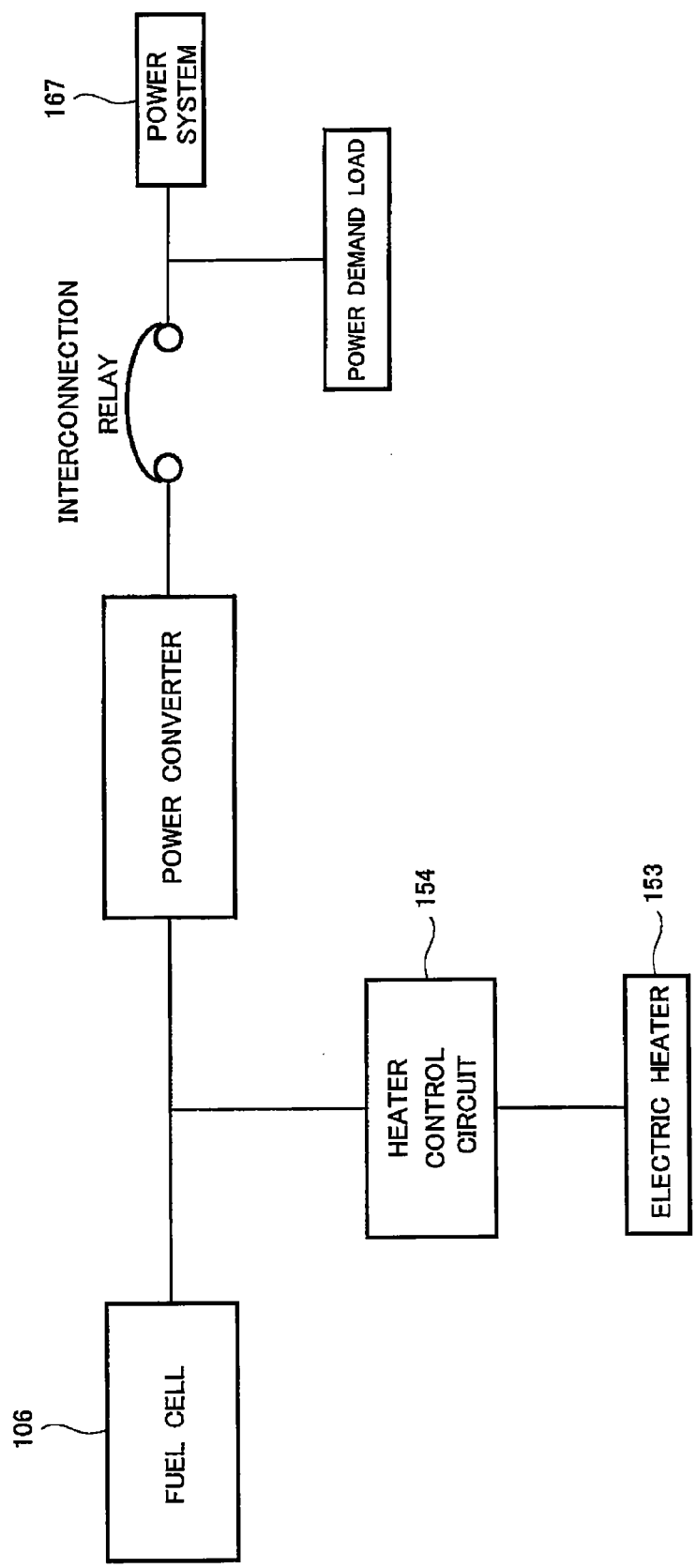
FIG. 4 is a block diagram showing a schematic configuration of a fuel cell system disclosed in Patent Literature 1.

FIG. 3 is a block diagram showing a schematic configuration of the fuel cell system according to Embodiment 3 of the present invention.

As shown in FIG. 3, the fuel cell system 200 according to Embodiment 3 of the present invention includes the power converter 100 according to Embodiment 1, a hydrogen generator 11, an oxidizing gas supply device 12, the fuel cell body 1, a heat recovery water passage 13, a heating medium passage 14, and a pump (delivery device) 15. It should be noted that the controller 9 for the power converter 100 also serves as a controller for each device included in the fuel cell system 200.

The hydrogen generator 11 includes a reformer 16, a shift converter 17, a selective oxidizer 18, a shift conversion heater 19, and a selective oxidation heater 20. The hydrogen generator 11 is configured to supply a fuel gas to the fuel cell body 1 while adjusting the flow rate of the fuel gas.

The reformer 16 causes a reforming reaction between a raw material and steam to generate a hydrogen-containing gas. The shift converter 17 and the selective oxidizer 18 cause shift reaction and selective oxidation reaction, respectively, of the hydrogen-containing gas generated by the reformer 16, thereby generating a fuel gas in which carbon monoxide of the hydrogen-containing gas is reduced to approximately 1 ppm. The generated fuel gas is supplied to the fuel cell body 1. It should be noted that the reformer 16, shift converter 17, and selective oxidizer 18 are configured in the same manner as a reformer, shift converter, and selective oxidizer that are included in a general hydrogen generator 11. Therefore, detailed descriptions of the reformer 16, shift converter 17, and selective oxidizer 18 are omitted.

The shift conversion heater 19 and the selective oxidation heater 20 are configured to be supplied with power from the buck converter circuit 8 at the time of, for example, start-up of the fuel cell system 200 (i.e., start-up of the hydrogen generator 11), and to heat the shift converter 17 and the selective oxidizer 18, respectively. An electric heater may be used as the shift conversion heater 19 and as the selective oxidation heater 20. If the hydrogen generator 11 is configured without incorporating therein the shift converter 17 and the selective oxidizer 18, then the shift conversion heater 19 and the selective oxidation heater 20 need not be provided in the hydrogen generator 11.

The oxidizing gas supply device 12 is configured to supply an oxidizing gas (air) to the fuel cell body 1 while adjusting the flow rate of the oxidizing gas. A fan, blower, etc., that is, a fan-like device, may be used as the oxidizing gas supply device 12, for example.

The fuel cell body 1 includes an anode and a cathode (which are not shown). In the fuel cell body 1, the fuel gas supplied to the anode and the oxidizing gas supplied to the cathode react with each other and thereby power and heat are generated. Various types of fuel cells, including a polymer electrolyte fuel cell and a solid oxide fuel cell, may be used as the fuel cell body 1. Since the fuel cell body 1 is configured in the same manner as a general fuel cell, the detailed description thereof is omitted. The generated power is supplied to an external load (e.g., an in-home electrical appliance) by the power converter 100.

The fuel cell body 1 is provided with a heat recovery water passage 1A, in which a heat recovery water for recovering the generated heat flows. The heat recovery water passage 13 is connected to the heat recovery water passage 1A. A heat recovery water tank 21, a heat exchanger 22, and a pump 15 are provided at positions along the heat recovery water passage 13.

The heat recovery water tank 21 is provided with a heat recovery water heater 23. The heat recovery water heater 23 is configured to be supplied with power from the buck converter circuit 8 and to heat the heat recovery water stored in the heat recovery water tank 21. An electric heater may be used as the heat recovery water heater 23. It should be noted that in the present invention, the heat recovery water tank 21 is considered to be part of the heat recovery water passage 13.

The pump 15 is configured to adjust the flow rate of the heat recovery water flowing through the heat recovery water passage 1A and the heat recovery water passage 13. In a case where surplus power is generated and the surplus power is to be supplied from the buck converter circuit 8 to the heat recovery water heater 23, the controller 9 controls the pump 15 to enhance the supply capability.

The heat exchanger 22 is configured to perform heat exchange between the heat recovery water flowing through the heat recovery water passage 13 and the heating medium (stored hot water) flowing through the heating medium passage 14. Various types of heat exchangers, including a total enthalpy heat exchanger, may be used as the heat exchanger 22.

A hot water tank 24 is provided at a position along the heating medium passage 14. The hot water tank 24 is provided with a heating medium heater 25. The heating medium heater 25 is configured to be supplied with power from the buck converter circuit 8 and to heat the heating medium stored in the hot water tank 24. An electric heater may be used as the heating medium heater 25. It should be noted that in the present invention, the hot water tank 24 is considered to be part of the heating medium passage 14.

The fuel cell system 200 further includes a freeze protection heater 26. The freeze protection heater 26 is configured to be supplied with power from the buck converter circuit 8 and to prevent freezing of, for example, the heat recovery water passage 13, the heat exchanger 22, the heating medium passage 14, and a reforming water passage through which water sent toward the reformer 16 flows. The water sent through the reforming water passage to the reformer 16 evaporates to become steam that is to be used in a reforming reaction.

It should be noted that the shift conversion heater 19, the selective oxidation heater 20, the heat recovery water heater 23, the heating medium heater 25, and the freeze protection heater 26 are examples of the internal load of the present invention. Accordingly, Embodiment 3 employs a configuration that includes the shift conversion heater 19, the selective oxidation heater 20, the heat recovery water heater 23, the heating medium heater 25, and the freeze protection heater 26. However, the present invention is not limited to such a configuration. Including at least one of the above heaters will suffice.

In the case of supplying output power of the fuel cell body 1 to an internal load via the boost converter circuit 3 and the buck converter circuit 8, the controller 9 may supply the power to at least one of the above heaters. Also, in the case of supplying output power of the fuel cell body 1 to internal loads via the boost converter circuit 3 and the buck converter circuit 8, the controller 9 may supply the power to each of the above heaters.

The fuel cell system 200 according to Embodiment 3, which is configured as described above, includes the power converter 100 according to Embodiment 1. Therefore, the fuel cell system 200 according to Embodiment 3 provides the same operational advantages as those provided by the power converter 100 according to Embodiment 1.

Further, in the fuel cell system 200 according to Embodiment 3, in the case of supplying output power of the fuel cell body 1 to the heat recovery water heater 23 via the boost converter circuit 3 and the buck converter circuit 8, the controller 9 performs control to enhance the supply capability of the pump 15. In this manner, the heat recovery efficiency of the fuel cell system 200 can be enhanced.

Although the power converter 100 according to Embodiment 1 is used as the power converter 100 of Embodiment 3, the present invention is not limited thereto. The power converter 100 according to Embodiment 2 may be used as the power converter 100 of Embodiment 3.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structures and/or functional details may be substantially modified without departing from the spirit of the present invention. In addition, various inventions can be made by suitable combinations of a plurality of components disclosed in the above embodiments.

INDUSTRIAL APPLICABILITY

The power converter of the present invention and the fuel cell system including the power converter are useful since they are capable of suppressing a load on the buck converter circuit when DC power generated by the power generator is temporarily supplied to the internal load such as an electric heater.

The invention claimed is:

1. A power converter configured to convert DC power generated by a power generator into AC power, the power converter comprising:
    a boost converter circuit configured to boost an output voltage of the power generator;
    an inverter circuit configured to convert an output voltage of the boost converter circuit into AC power and to interconnect the AC power with a power system;
    a buck converter circuit configured to perform power conversion of output power of the boost converter circuit and to supply resultant power to an internal load; and
    a controller, wherein
    the controller is configured to:
        control the output voltage of the boost converter circuit to be higher than or equal to a first voltage value which is greater than the maximum value of AC voltage of the power system, in a case of interconnecting output power of the power generator with the power system via the boost converter circuit and the inverter circuit; and
        control the output voltage of the boost converter circuit to be lower than or equal to a second voltage value which is less than the maximum value of AC voltage of the power system, in a case of supplying output power of the power generator to the internal load via the boost converter circuit and the buck converter circuit.

2. The power converter according to claim 1, further comprising a diode disposed between the inverter circuit and the boost converter circuit.

3. The power converter according to claim 1, further comprising a disconnection mechanism, disposed closer to the power system than the inverter circuit, which is configured to close in a case of interconnecting output power of the inverter circuit with the power system and to open in a case of not interconnecting output power of the inverter circuit with the power system, wherein
    the controller controls the disconnection mechanism to open in a case of causing the internal load to consume all of the output power of the power generator via the boost converter circuit and the buck converter circuit.

4. A fuel cell system comprising:
    the power converter according to claim 1;
    a fuel cell body;
    a heat recovery water passage through which heat recovery water for recovering heat from the fuel cell body flows; and
    a heating medium passage through which a heating medium for performing heat exchange with the heat recovered by the heat recovery water flows, wherein
    the internal load is at least one of: a freeze protection heater; a heat recovery water heater configured to heat the heat recovery water flowing through the heat recovery water passage; and a heating medium heater configured to heat the heating medium flowing through the heating medium passage.

5. The fuel cell system according to claim 4, further comprising a hydrogen generator configured to reform a raw material gas and to supply a resultant fuel gas to the fuel cell body, wherein
    the internal load is at least one of: a selective oxidation heater configured to heat a selective oxidizer formed in the hydrogen generator; and a shift conversion heater configured to heat a shift converter formed in the hydrogen generator.

6. The fuel cell system according to claim 4, further comprising a delivery device which is provided at the heat recovery water passage and which is configured to cause the heat recovery water to flow, wherein
the internal load is the heat recovery water heater configured to heat the heat recovery water passage, and
in a case of supplying output power of the fuel cell body to the heat recovery water heater via the boost converter circuit and the buck converter circuit, the controller controls the delivery device to increase a water flow rate in the heat recovery water passage.

7. A method for operating a power converter configured to convert DC power generated by a power generator into AC power,
the power converter including:
a boost converter circuit configured to boost an output voltage of the power generator;
an inverter circuit configured to convert an output voltage of the boost converter circuit into AC power and to interconnect the AC power with a power system; and
a buck converter circuit configured to perform power conversion of output power of the boost converter circuit and to supply resultant power to an internal load, the method comprising:
controlling the output voltage of the boost converter circuit to be higher than or equal to a first voltage value which is greater than the maximum value of AC voltage of the power system, in a case of interconnecting output power of the power generator with the power system via the boost converter circuit and the inverter circuit; and controlling the output voltage of the boost converter circuit to be lower than or equal to a second voltage value which is less than the maximum value of AC voltage of the power system, in a case of supplying output power of the power generator to the internal load via the boost converter circuit and the buck converter circuit.

\* \* \* \* \*